(12) United States Patent  (10) Patent No.: US 8,899,158 B2
Foege  (45) Date of Patent: Dec. 2, 2014

(54) CONSIST HAVING SELF-POWERED TENDER CAR

(75) Inventor: Aaron Gamache Foege, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 246 days.

(21) Appl. No.: 13/563,154

(22) Filed: Jul. 31, 2012

(65) Prior Publication Data

US 2014/0033948 A1 Feb. 6, 2014

(51) Int. Cl.
*B61C 3/00* (2006.01)
(52) U.S. Cl.
USPC .............. 105/35; 104/286; 104/287; 104/288
(58) Field of Classification Search
USPC ........... 105/1.4, 231, 236; 104/287, 288, 289; 246/187 A
See application file for complete search history.

(56) References Cited

U.S. PATENT DOCUMENTS

| | | | |
|---|---|---|---|
| 308,948 A | 12/1884 | Bruce | |
| 331,716 A | 12/1885 | Katz | |
| 338,028 A | 3/1886 | Bower | |
| 3,352,294 A | 11/1967 | Biller et al. | |
| 4,137,006 A | 1/1979 | Becker | |
| 4,551,065 A | 11/1985 | Becker | |
| 4,630,572 A | 12/1986 | Evans | |
| 4,646,701 A | 3/1987 | Fukumoto | |
| 5,129,328 A | 7/1992 | Donnelly | |
| 5,269,225 A | 12/1993 | Bosshart et al. | |
| 5,375,580 A | 12/1994 | Stolz et al. | |
| 5,544,483 A | 8/1996 | Heuer | |
| 5,567,105 A | 10/1996 | Williams | |
| 5,609,141 A | 3/1997 | Matsuoka et al. | |
| 5,692,458 A | 12/1997 | Green | |
| 5,887,567 A | 3/1999 | White et al. | |
| 6,408,766 B1 * | 6/2002 | McLaughlin et al. | 105/231 |
| 6,460,517 B1 | 10/2002 | Dauer | |
| 6,506,018 B1 | 1/2003 | Brennan | |

(Continued)

FOREIGN PATENT DOCUMENTS

CH 1 261 237 3/1969
DE 102009042256 4/2011

(Continued)

OTHER PUBLICATIONS

Foege, "Consist Having Self-Propelled Tender Car", U.S. Appl. No. 13/563,114 for 08350.0659 dated Jul. 31, 2012.

(Continued)

*Primary Examiner* — Jason C Smith
(74) *Attorney, Agent, or Firm* — Finnegan, Henderson, Farabow, Garrett & Dunner LLP

(57) ABSTRACT

The disclosure is directed to a tender car for a consist. The tender car may have a frame, a truck configured to support the frame, and a wheel rotatably connected to the truck. The tender car may also have a motor operatively connected to the wheel and configured to generate electric power when the wheel is rotated. The tender car may further have a tank mounted to the frame and configured to hold a liquefied gaseous fuel, and a fuel pump mounted to the frame and configured to pump the liquefied gaseous fuel from the tank. The fuel pump may be driven by electric power generated by the motor.

17 Claims, 4 Drawing Sheets

(56) References Cited

U.S. PATENT DOCUMENTS

| | | | |
|---|---|---|---|
| 6,615,118 B2 * | 9/2003 | Kumar | 701/19 |
| 6,698,211 B2 | 3/2004 | Gustafson | |
| 6,725,134 B2 * | 4/2004 | Dillen et al. | 701/19 |
| 6,898,940 B2 | 5/2005 | Gram et al. | |
| 6,907,735 B2 | 6/2005 | Wolff et al. | |
| RE39,599 E * | 5/2007 | Kanamaru | 123/509 |
| 7,231,877 B2 | 6/2007 | Kumar | |
| 7,304,445 B2 | 12/2007 | Donnelly | |
| 7,308,889 B2 | 12/2007 | Post et al. | |
| 7,373,931 B2 | 5/2008 | Lennox et al. | |
| 7,430,967 B2 * | 10/2008 | Kumar | 105/35 |
| 7,448,328 B2 | 11/2008 | Kumar | |
| 7,631,635 B2 | 12/2009 | Hochstein et al. | |
| 7,689,341 B2 | 3/2010 | Miller | |
| 7,765,859 B2 * | 8/2010 | Connell et al. | 73/121 |
| 8,056,540 B2 * | 11/2011 | DeBastos et al. | 123/521 |
| 8,079,437 B2 | 12/2011 | Rosman | |
| 8,095,253 B2 * | 1/2012 | Kane et al. | 701/20 |
| 8,112,191 B2 * | 2/2012 | Kumar et al. | 701/22 |
| 8,196,518 B2 * | 6/2012 | Bachman | 105/35 |
| 2004/0149254 A1 | 8/2004 | Piock | |
| 2005/0279242 A1 * | 12/2005 | Maier et al. | 105/26.05 |
| 2006/0005736 A1 * | 1/2006 | Kumar | 105/1.4 |
| 2008/0000381 A1 | 1/2008 | Bartley et al. | |
| 2008/0083576 A1 | 4/2008 | Read | |
| 2008/0121136 A1 | 5/2008 | Mari et al. | |
| 2008/0302093 A1 | 12/2008 | Montgomery et al. | |
| 2009/0187291 A1 | 7/2009 | Daum et al. | |
| 2009/0234521 A1 * | 9/2009 | Kumar et al. | 701/19 |
| 2010/0019103 A1 * | 1/2010 | Kane et al. | 246/186 |
| 2010/0070117 A1 | 3/2010 | Siffert | |
| 2010/0114404 A1 | 5/2010 | Donnelly | |
| 2010/0175579 A1 * | 7/2010 | Read | 105/1.4 |
| 2010/0175666 A1 * | 7/2010 | Nishio et al. | 123/458 |
| 2010/0186619 A1 * | 7/2010 | Kumar | 104/289 |
| 2011/0061364 A1 | 3/2011 | Raman | |
| 2011/0067390 A1 | 3/2011 | Cook | |
| 2011/0162903 A1 | 7/2011 | Stragier | |
| 2011/0203480 A1 | 8/2011 | Donnelly | |
| 2011/0217610 A1 * | 9/2011 | Guo et al. | 429/429 |
| 2011/0257869 A1 * | 10/2011 | Kumar et al. | 701/103 |
| 2012/0085260 A1 | 4/2012 | Nichini et al. | |
| 2014/0033941 A1 * | 2/2014 | Foege et al. | 105/1.4 |
| 2014/0033942 A1 * | 2/2014 | Foege | 105/1.4 |
| 2014/0033943 A1 * | 2/2014 | Foege et al. | 105/1.4 |
| 2014/0033944 A1 * | 2/2014 | Foege | 105/1.4 |
| 2014/0033948 A1 * | 2/2014 | Foege | 105/236 |

FOREIGN PATENT DOCUMENTS

| | | |
|---|---|---|
| EP | 0 069 717 | 12/1983 |
| EP | 2 154 044 A2 | 2/2010 |
| EP | 2 154 044 B1 | 1/2012 |
| JP | 56 118533 | 9/1981 |
| JP | 6 033 784 | 2/1994 |
| JP | 2000 136756 | 5/2000 |
| JP | 2007 113442 | 5/2007 |
| JP | 2008 201890 | 9/2008 |
| JP | 2010 023776 | 2/2010 |
| RU | 2009142173 | 5/2011 |
| WO | WO 2008/025158 | 3/2008 |
| WO | WO 2008/037571 | 4/2008 |
| WO | WO 2009/021262 | 2/2009 |
| WO | WO 2010/012252 | 2/2010 |

OTHER PUBLICATIONS

Foege, "Fuel System for Consist Having Daughter Locomotive", U.S. Appl. No. 13/562,242 for 08350.0754 dated Jul. 31, 2012.

Foege, "Energy Recovery System for a Mobile Machine", U.S. Appl. No. 13/563,414 for 08350.0724 dated Jul. 31, 2012.

Foege et al, "Energy Recovery System for a Mobile Machine", U.S. Appl. No. 13/562,808 for 08350.0725 dated Jul. 31, 2012.

Foege et al., "Fuel Distribution System for Multi-Locomotive Consist", U.S. Appl. No. 13/563,220 for 08350.0666 dated Jul. 31, 2012.

Coldren et al., "Consist Power System Having Auxiliary Load Management", U.S. Appl. No. 61/677,770 for 08350.6333 dated Jul. 31, 2012.

* cited by examiner

CONSIST HAVING SELF-POWERED TENDER CAR

TECHNICAL FIELD

The present disclosure relates generally to a consist and, more particularly, to a consist having a tender car capable of powering its own electrical loads.

BACKGROUND

Natural gas has been used as fuel for internal combustion engines in consist locomotives. Because natural gas has a lower volumetric energy density than traditional fuels, such as diesel and gasoline, the natural gas used by the locomotives is generally only practical to store in a liquefied state ("LNG"). At atmospheric pressures, the natural gas must be chilled to below about −160° C. to remain in liquid form. Consists having LNG-fueled locomotives store the LNG in insulated tank cars (a.k.a., tender cars) that are towed by the locomotive.

In order to be utilized as an effective engine fuel, liquefied natural gas requires more energy than a liquid counterpart to be stored, compressed, vaporized and transported within a train consist. This relatively greater amount of energy required to power ancillary equipment is typically drawn from the power output of the consist's main engine. The additional consumption of power results in undesirable consequences with regards to fuel efficiency and engine power availability.

One method of improving fuel and engine power efficiencies is described in U.S. Patent Publication No. 2010/0186619 ("the '619 publication") of Kumar that published on Jul. 29, 2010. The '619 publication describes locomotives and rail cars that have the capacity to generate electrical power from dynamic braking, to store the power, and to use the power at a later time during motoring. In particular, the '619 publication describes storing electrical power generated from dynamic braking in an energy capture and storage system. The energy capture and storage system effectively utilizes electrical energy that, in previous consist designs, was dissipated away on resistive grids. The energy is used to power traction motor/propulsion systems, for as long as the energy lasts.

Although the system of the '619 publication may be capable of making use of previously wasted electrical energy, it does not present solutions for alleviating the load on a consist's main engine that is related to the storage, processing and distribution of liquefied natural gas.

The system of the present disclosure solves one or more of the problems set forth above and/or other problems with existing technologies.

SUMMARY

In one aspect, the disclosure is directed to a tender car for a consist. The tender car may include a frame, a truck configured to support the frame, and a wheel rotatably connected to the truck. The tender car may also include a motor operatively connected to the wheel and configured to generate electric power when the wheel is rotated. The tender car may further include a tank mounted to the frame and configured to hold a liquefied gaseous fuel, and a fuel pump mounted to the frame and configured to pump the liquefied gaseous fuel from the tank. The fuel pump may be driven by electric power generated by the motor.

In another aspect, the disclosure is directed to a method of powering a tender car. The method may include converting kinetic energy of the tender car to electric power via a motor located onboard the tender car. The method may further include directing the electric power to a fuel pump to pump a liquefied gaseous fuel from a tank onboard the tender car.

DETAILED DESCRIPTION

Figure 1:
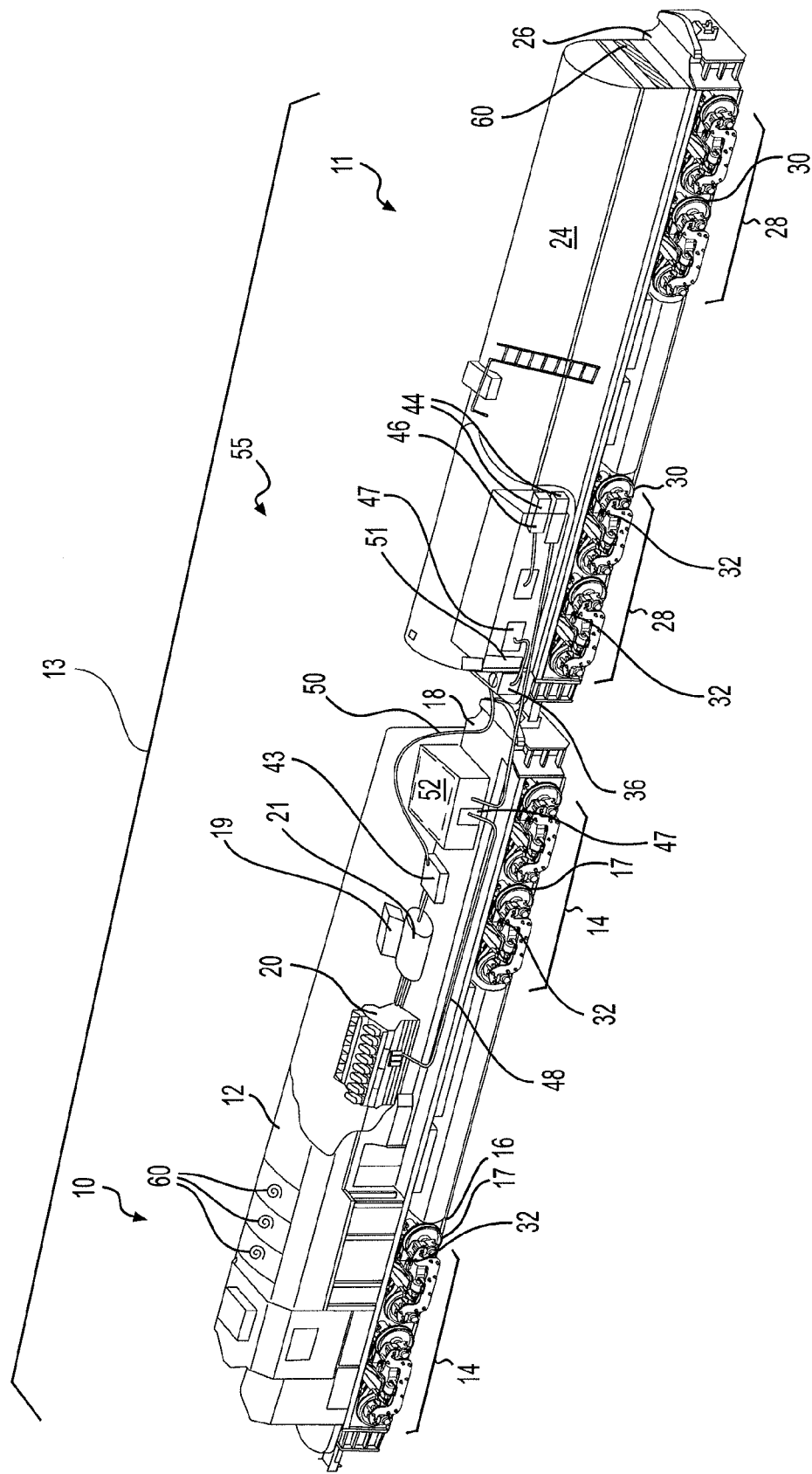
FIG. 1 is a pictorial illustration of an exemplary disclosed auxiliary power system.

FIG. 1 illustrates an exemplary embodiment of a locomotive 10 and a tender car 11 that is towed by locomotive 10. In some embodiments, additional cars may be towed by locomotive 10, for example, a passenger car (not shown), a cargo container car (not shown), or another type of car. Together, locomotive 10, tender car 11 and the other cars connected to them may comprise a consist 13.

Locomotive 10 may include a car body 12 supported at opposing ends by a plurality of trucks 14 (e.g., two trucks 14). Each truck 14 may be configured to engage a track 16 via a plurality of wheels 17, and support a frame 18 of car body 12. Any number of main engines 20 may be mounted to frame 18 and configured to produce electricity that drives wheels 17 included within each truck 14. In the exemplary embodiment shown in FIG. 1, locomotive 10 includes one main engine 20.

Main engine 20 may be a large engine, for example an engine having sixteen cylinders and a rated power output of about 4,000 brake horsepower (bhp). Main engine 20 may be configured to combust a gaseous fuel, such as natural gas, and generate a mechanical output that drives a main generator 21 to produce electric power. The electric power from main generator 21 may be used to propel locomotive 10 via one or more traction motors 32 associated with wheels 17 and, in some instances, directed to one or more auxiliary loads 43 of consist 13 (e.g., lights, heaters, refrigeration devices, air conditioners, fans, etc.). A switch 23 (shown only in FIG. 2) positioned on locomotive 10 may selectively connect main generator 21 to both traction motors 32 and auxiliary loads 43, to only traction motors 32, or to only auxiliary loads 43. Consequently, electric power from main generator 21 may be shared or dedicated solely to propulsion or auxiliary loads, as desired. It should be noted that main engine 20 may have a different number of cylinders, a different rated power output, and/or be capable of combusting another type of fuel, if desired.

Main generator 21 may be an induction generator, a permanent-magnet generator, a synchronous generator, or a switched-reluctance. In one embodiment, main generator 21 may include multiple pairings of poles (not shown), each pairing having three phases arranged on a circumference of a stator (not shown) to produce an alternating current.

Traction motors 32, in addition to providing the propelling force of consist 13 when supplied with electric power, may also function to slow locomotive 10. This process is known in the art as dynamic braking. When a traction motor 32 is not needed to provide motivating force, it can be reconfigured to operate as a generator. As such, traction motors 32 may convert the kinetic energy of consist 13 into electric power, which has the effect of slowing consist 13. The electric power generated during dynamic braking is typically transferred to one or more resistance grids 60 mounted on car body 12. At resistance grids 60, the electric power generated during dynamic braking is converted to heat and dissipated into the atmosphere. Alternatively or additionally, electric power generated from dynamic braking may be routed to an energy storage system 19 used to selectively provide supplemental power to traction motors 32.

Figure 2:
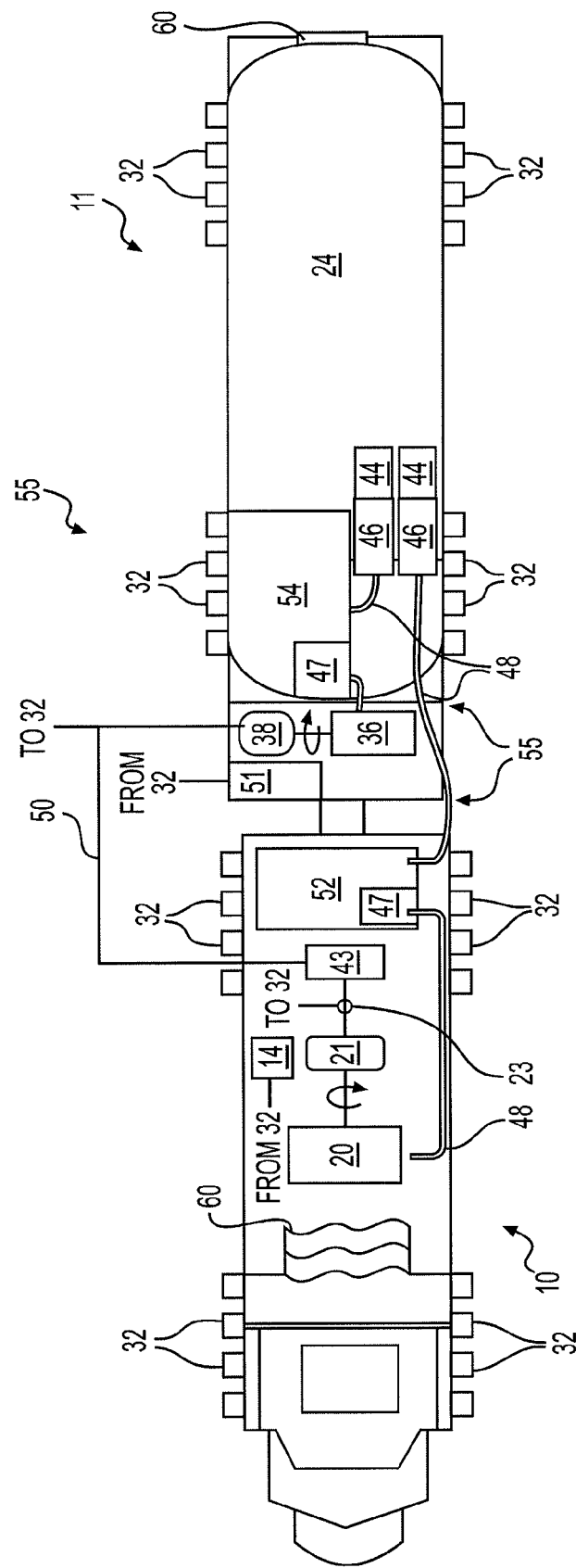
FIG. 2 is a diagrammatic illustration of a top view of the system displayed in FIG. 1.
Figure 3:
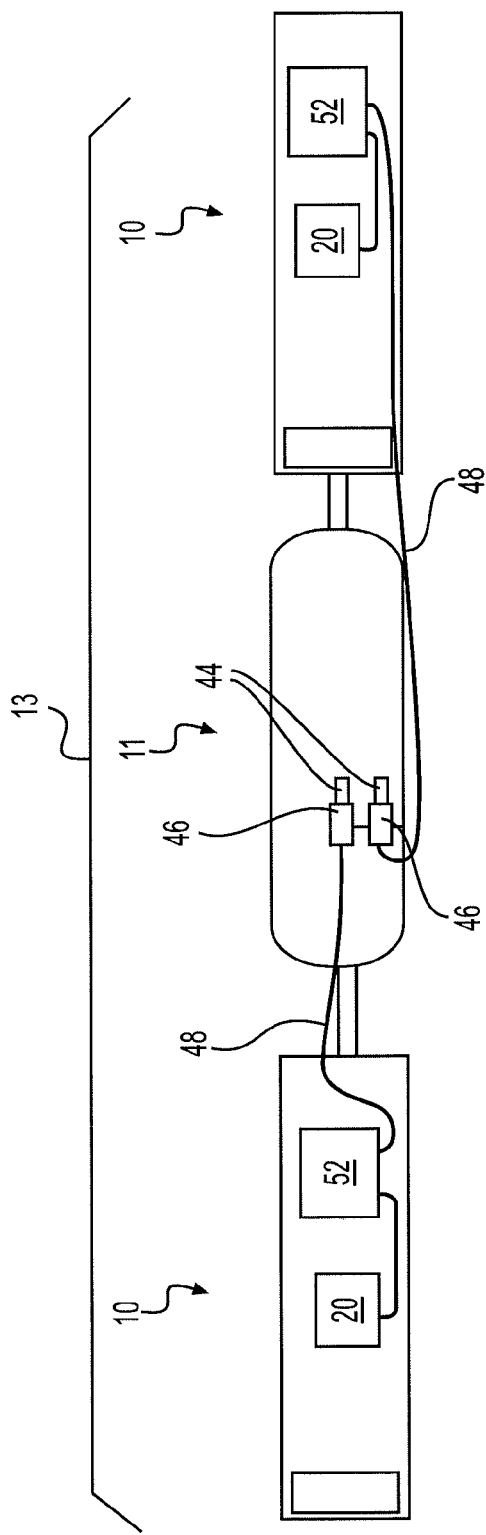
FIG. 3 is a diagrammatic illustration of an alternative embodiment of the system displayed in FIG. 1.

Tender car 11 may be provided with an auxiliary engine 36 that is mechanically connected to an auxiliary generator 38 (shown only in FIG. 2). Auxiliary engine 36 and auxiliary generator 38 may be mounted to a frame 26 that is supported by a plurality of trucks 28. Similar to truck 14, each truck 28 may be configured to engage track 16 via a plurality of wheels 30.

Auxiliary engine 36 may be smaller and have a lower rated output than main engine 20. For example, auxiliary engine 36 may have six to twelve cylinders and a rated power output of about 400-1400 bhp. It should be noted, however, that engines with a different number of cylinders or rated power output may alternatively be utilized, if desired. Similar to main engine 20, auxiliary engine 36 may combust natural gas or another type of gaseous fuel to generate a mechanical output used to rotate auxiliary generator 38. Auxiliary generator 38 may produce an auxiliary supply of electric power directed to one or more of the auxiliary loads 43 (i.e., loads not driven by main engine 20) of consist 13.

Auxiliary generator 38, in addition to providing electric power to auxiliary loads 43 of locomotive 10 or to the other cars of consist 13, may also provide electric power to one or more traction motors 32 on tender car 11, if desired. Similar to traction motors 32 located on locomotive 10, traction motors 32 of tender car 11 may function to propel tender car 11 by rotating wheels 30. In this manner, tender car 11 may be self-propelled and capable of moving about on its own power, independent of locomotive 10 or any other car (when uncoupled from locomotive 10 and the other cars).

Similar to locomotive 10, tender car 11 may generate its own electric power via dynamic braking via traction motors 32. The generated electric power may be stored at an electric power storage system 51 onboard tender car 11. Energy stored within system 51 may be selectively provided to traction motors 32 of tender car 11, and/or to any auxiliary load 43 of consist 13.

Auxiliary generator 38 and/or energy storage system 51 of tender car 11 may provide electric power to auxiliary loads 43 on locomotive 10 via an electric conduit 50. With this configuration, main engine 20 may be capable of shutting down or otherwise functioning at a reduced-output level and auxiliary loads 43 may continue to function normally by utilizing power provided by auxiliary generator 38.

Tender car 11 may also include one or more tanks 24 configured to store a liquid fuel (e.g., LNG) for combustion within main engine 20 and auxiliary engine 36. In the disclosed embodiment, a single tank 24 is shown. Tank 24 may be an insulated, single or multi-walled tank configured to store the liquid fuel at low temperatures, such as below about −160° C. Tanks 24 may be integral with frame 18 of tender car 11.

A fuel delivery circuit 55 may supply fuel from tank 24 to main engine 20 on locomotive 10 and to auxiliary engine 36 on tender car 11. Fuel delivery circuit 55 may include, among other things, one or more fuel pumps 44, one or more conduits 48, one or more heat exchangers 46, one or more accumulators (e.g., a main accumulator 52 and an auxiliary accumulator 54), and one or more injectors (not shown) that condition, pressurize or otherwise transport low-temperature liquid fuel, as is known in the art. Fuel delivery circuit 55 may also include one or more regulators 47 that help to regulate flow between main and auxiliary accumulators 52, 54 and engines 20, 36, respectively.

As illustrated in FIGS. 1 and 2, pumps 44 may each be situated near or within tank 24, and embody, for example, cryogenic pumps, piston pumps, centrifugal pumps, or any other pumps that are known in the industry. Pumps 44 may be powered by engines 20 and/or 36. Alternatively, pumps 44 may be powered by electric storage systems 19 and/or 51, if desired. Pumps 44 may pressurize the liquid fuel to an operating pressure of about 5,000 psi, and push the liquid fuel through heat exchangers 46 via conduits 48.

As illustrated in FIG. 1, heat exchangers 46 may have components situated near or within tank 24. Heat exchangers 46 may provide heat sufficient to vaporize the fuel as it is moved by pumps 44. Upon vaporization, the fuel may be transported via conduits 48 to, and stored at, accumulators 52, 54.

Accumulators 52, 54 on locomotive 10 and tender car 11, may be configured to receive pressurized gaseous fuel. Accumulators 52, 54 may embody, for example, compressed gas, membrane/spring, bladder-type, or other suitable accumulators configured to collect pressurized gaseous fuel and discharge the fuel to main engine 20 or auxiliary engine 36 via regulator 47.

Regulators 47 may be configured to selectively allow fluid communication between accumulators 52, 54 and main and auxiliary engines 20, 36, respectively. When regulators 47 open, they may allow gaseous fuel to escape accumulators 52, 54 and flow to main and/or auxiliary engines 20, 36. Regulators 47 may each include a spring-loaded mechanism (not shown) that opens at a predetermined pressure to avoid overpressurization of accumulators 52, 54. Additionally or alternatively, regulators 47 may each include one or more controllable actuators, such as one or more electric solenoids that are operable to open regulator 47 when actuated.

As illustrated in the simplified illustrations of FIGS. 3-6, tender car 11 may simultaneously transport fuel to multiple locomotives 10 of consist 13, in multiple different ways. For example, in FIG. 3, tender car 11 is shown as delivering fuel from a single location on tender car 11 to locomotives 10 at opposing ends of tender car 11. In this embodiment, each main engine 20 is fueled by a separate pump 44 that supplies fuel based on the unique demands each main engine 20 via separate conduits 48.

Figure 4:
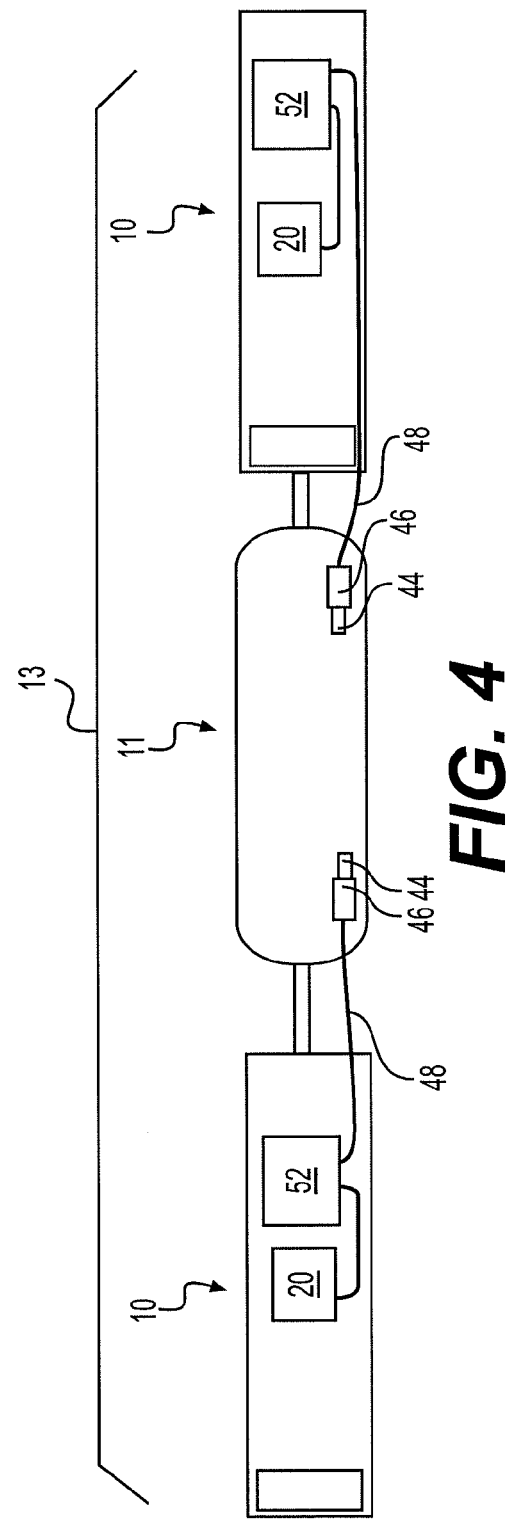
FIG. 4 is a diagrammatic illustration of another alternative embodiment of the system displayed in FIG. 1.

FIG. 4 illustrates another embodiment, wherein tender car 11 includes two pumps 44 delivering fuel through two separate conduits 48 from opposite ends of tender car 11. Locomotives 10 may be configured to receive fuel via conduit 48 from either a front end or a rear end, such that they may be fueled by either fore or aft-coupled tender cars 11.

Figure 5:
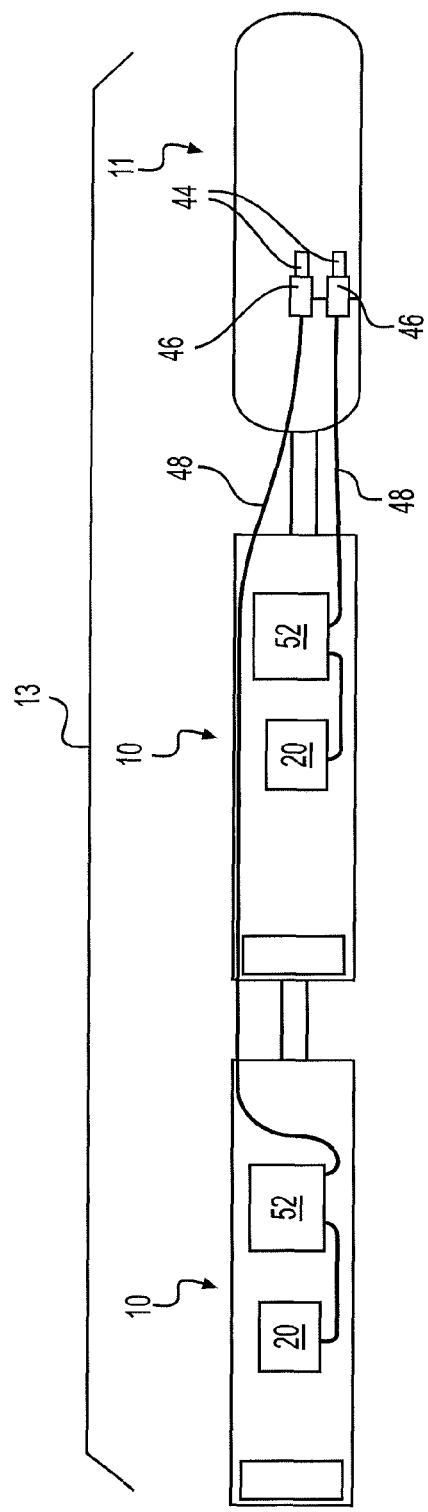
FIG. 5 is a diagrammatic illustration of another alternative embodiment of the system displayed in FIG. 1.

FIG. 5 illustrates another alternative embodiment, in which tender car 11 delivers fuel to two fore-coupled locomotives 10 with two separate pumps 44 located at the same end of tender car 11. In this embodiment, each engine 20 is fueled by a separate pump 44.

Figure 6:
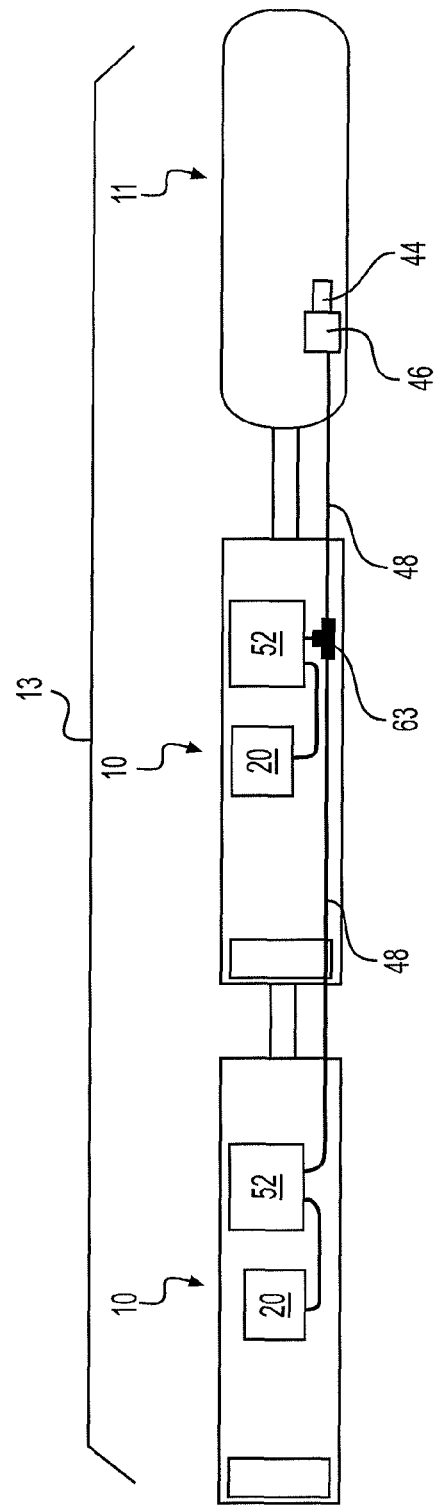
FIG. 6 is a diagrammatic illustration of another alternative embodiment of the system displayed in FIG. 1.

FIG. 6 illustrates tender car 11 having a single pump 44 in parallel fluid communication with two locomotives 10. In this configuration, a tee 63 may connect branching ends of conduit 48 to two main engines 20.

INDUSTRIAL APPLICABILITY

The disclosed tender car may be applicable to any consist 13 utilizing a low-temperature or highly volatile liquefied fuel. The disclosed tender car may remove the energy burden of storing, compressing, vaporizing, and transporting liquefied gaseous fuel from main engine 20 of consist 13. The removal of this burden may improve fuel efficiencies and power capacity of main engine 20.

The disclosed tender car may remove the energy burden from main engine 20 by supplying at least some of the electrical power required to drive fuel pumps 44. The electrical power supplied by the disclosed tender car may originate from use of traction motors 32 of tender car 11 to dynamically brake consist 13. Through dynamic braking, kinetic energy of consist 13 may be converted into electric power used to drive pumps 44. In addition, the electric power can be stored for future use and/or directed to locomotive 10 to further reduce loads on main engine 20. The disclosed tender car may also enable consist 13 to conserve energy by creating a store of compressed fuel, from which engines 20 and 36 may operate during non-braking operation.

It will be apparent to those skilled in the art that various modifications and variations can be made to the disclosed tender car without departing from the scope of the disclosure. Other embodiments of the tender car will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A tender car of a consist, comprising:
   a frame;
   a truck configured to support the frame;
   a wheel rotatably connected to the truck;
   a motor operatively connected to the wheel and configured to generate electric power when the wheel is rotated;
   a tank mounted to the frame and configured to hold a liquefied gaseous fuel; and
   a fuel pump mounted to the frame and configured to pump the liquefied gaseous fuel from the tank,
   an auxiliary engine configured to generate electric power directed to the fuel pump, wherein the auxiliary engine is powered by fuel pumped by the fuel pump, and
   wherein the fuel pump is driven by electric power generated by the motor.

2. The tender car of claim 1, wherein the tender car is connectable to a locomotive of the consist and configured to receive electric power from the locomotive to drive the fuel pump.

3. The tender car of claim 2, further including a conduit connectable between the pump and a main engine of the locomotive.

4. The tender car of claim 1, further including an energy storage system configured to store electric power generated by the motor.

5. The tender car of claim 4, wherein the energy storage system is further configured to direct stored electric power to the fuel pump.

6. The tender car of claim 1, further including an accumulator configured to store fuel pumped by the fuel pump during generation of electric power by the motor.

7. The tender car of claim 1, wherein the fuel pump is further configured to pump fuel to a locomotive of the consist.

8. The tender car of claim 1, further including a resistance grid configured to burn away excess electric power generated by the motor.

9. A method of powering a tender car, comprising:
   converting kinetic energy of the tender car to electric power via a motor located onboard the tender car;
   directing the electric power to a fuel pump to pump a liquefied gaseous fuel from a tank onboard the tender car; and
   directing the fuel to an auxiliary engine located onboard the tender car, wherein the auxiliary engine is configured to generate electric power directed to the fuel pump.

10. The method of claim 9, further including directing fuel pumped from the tank to a locomotive pulling the tender car.

11. The method of claim 10, further including combusting the fuel onboard the locomotive to generate electric power used to propel the locomotive and tender car.

12. The method of claim 11, further including directing electric power from the locomotive to the tender car to power the fuel pump.

13. The method of claim 9, further including storing for future use electric power converted from kinetic power via the motor.

14. The method of claim 13, further including using stored electric power to power the fuel pump.

15. The method of claim 9, further including storing for future use electric power converted from kinetic power via the motor onboard a locomotive towing the tender car.

16. The method of claim 9, further including storing fuel pumped by the fuel pump during conversion of kinetic power to electric power via the motor.

17. The method of claim 9, further including directing excess electric power converted from kinetic power via the motor to a resistance grid located on the tender car to burn away the excess electric power.

* * * * *